United States Patent [19]

Butler et al.

[11] 4,348,504

[45] Sep. 7, 1982

[54] METHOD FOR MAKING BLOCK SILOXANE COPOLYMERS

[75] Inventors: Nora Butler; Edward S. Jessop; John R. Kolb, all of Livermore, Calif.

[73] Assignee: The United States of America as represented by the Department of Energy, Washington, D.C.

[21] Appl. No.: 238,235

[22] Filed: Feb. 25, 1981

[51] Int. Cl.$^3$ .................. C08G 67/00; C08G 77/08; C08G 77/32

[52] U.S. Cl. .................... 525/477; 528/22; 528/32; 528/33; 528/37

[58] Field of Search ............ 528/22, 33, 37, 32; 525/477

[56] References Cited

U.S. PATENT DOCUMENTS

| | | | |
|---|---|---|---|
| 3,243,404 | 3/1966 | Mertellock | 525/477 |
| 3,467,686 | 9/1969 | Creamer | 556/410 |
| 3,503,925 | 3/1970 | Griffin | 525/477 |
| 3,578,726 | 5/1971 | Bostick et al. | 528/34 |
| 3,642,851 | 2/1972 | Bennett | 556/417 |
| 4,272,624 | 6/1981 | Rizzano | 528/37 |

FOREIGN PATENT DOCUMENTS 730764  4/1980  U.S.S.R. .............. 525/477

OTHER PUBLICATIONS

Hurd, et al., "The Mechanism of the Base-Catalyzed Rearrangement of Organopolysiloxanes", *J. Am. Chem. Soc.* 76, pp. 249–251 (1954).

Kantor, et al., "The Mechanism of the Acid-and Base--Catalyzed Equilibration of Siloxanes", *J. Amer. Chem. Soc.* 76, pp. 5190–5197 (1954).

West, et al., "New Anionic Rearrangements VIII. 1,4-Anionic Rearrangement of Silylethylenediamines", *J. Amer. Chem. Soc. 90:3*, pp. 727–731 (1968).

*Primary Examiner*—Wilbert J. Briggs, Sr.
*Attorney, Agent, or Firm*—Patrick T. King; Roger S. Gaither; Richard G. Besha

[57] ABSTRACT

A method for synthesizing block polysiloxane copolymers. Diorganoscyclosiloxanes and an end-blocking compound are interacted in the presence of a ring opening polymerization catalyst, producing a blocked prepolymer. The prepolymer is then interacted with a silanediol, resulting in condensation polymerization of the prepolymers. A second end-blocking compound is subsequently introduced to end-cap the polymers and copolymers formed from the condensation polymerization.

11 Claims, No Drawings

METHOD FOR MAKING BLOCK SILOXANE COPOLYMERS

The United States Government has rights in this invention pursuant to Contract W-7405-ENG-48 between the U.S. Department of Energy and the University of California for the operation of Lawrence Livermore National Laboratory.

BACKGROUND OF THE INVENTION

The present invention relates generally to a method for synthesizing siloxane polymers, and more particularly, to a process for preparing block diorganosiloxane copolymers.

The synthesis of multiple sequence organopolysiloxane block copolymers is known. As described by U.S. Pat. No. 3,578,726, issued to Bostick, such polymers are prepared by initially interacting a silane, having at least two hydrolyzable radicals attached to silicon, with a polydiorganosiloxane having at least one terminal alkali metal silanolate radical. The polydiorganosiloxane is derived from a diorganocyclotrisiloxane and a preformed alkali metal silanolate-hexamethylphosphoramide complex. This synthesis is dependent on the formation of the alkali metal silanolate complex, and requires the polydiorganosiloxane to have a terminal alkali metal silanolate, both of which provide inherent limitations.

In one known synthesis of diorganosiloxanes, a phenyl prepolymer is first prepared by mixing octamethylcyclotetrasiloxane (SiMe$_2$O)$_4$ and octaphenylcyclotetrasiloxane (Si$\phi_2$O)$_4$ under argon (Ar). In the above formulas and throughout the rest of this disclosure, Me represents a methyl (—CH$_3$) radical, Et represents an ethyl (—C$_2$H$_5$) radical, Vi represents a vinyl (—CH=CH$_2$) radical, and $\phi$ represents a phenyl (—C$_6$H$_5$) radical. A catalyst, Me$_4$N$^+$ $^-$(O SiMe$_2$)$_n$OH (N-catalyst), where n is approximately 4, is added in increments, resulting in the formation of a prepolymer. The prepolymer is then re-equilibrated with (SiMeViO)$_4$, a dimethylaminosilyl-terminated oligomer Me$_2$N-(SiMe$_2$O)$_3$SiMe$_2$NMe$_2$, and N-catalyst. The reaction product is finally condensed with HO(SiMe$_2$O)$_n$H, where n is from 15–21 inclusive. The catalyst, however, is used in the production of the prepolymer, and additionally in the reaction of the prepolymers with the dimethylaminosilyl-terminated oligomer. A significant limitation of this synthesis is that a very large percentage of the initial diorganocyclosiloxane materials is not converted to polymers. The prepolymer that is formed has an exceptionally large molecular weight because the siloxane starting materials combine in an unchecked fashion. The result is creation of a very high molecular weight polymer, with a large percentage of initial reactants wasted. A second limitation of this synthetic sequence is the time for the process to proceed to completion. Reportedly, this sequence can take upwards of two weeks.

It has now been discovered that polydiorganosiloxane block copolymers can be prepared in a much shorter time than previously known, and with a much higher synthetic yield, while minimizing unreacted starting materials waste. The starting materials are essentially all synthesized to the final product, in comparison to existing known synthesis methods wherein up to seventy percent of the starting materials are wasted.

SUMMARY

It is an object of the invention to provide an efficient process for synthesizing polydiorganosiloxane block copolymers.

Another object of the invention is to provide a rapid synthesis for polydiorganosiloxane block copolymers which is faster than methods previously known.

Yet another object of the invention is to provide an efficient, rapid synthesis wherein essentially all of the starting materials are converted to polydiorganosiloxane block copolymers.

Additional objects, advantages, and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the synthesis of this invention may comprise interacting a diorganocyclosiloxane selected from the group consisting of (Me$_2$SiO)$_4$, ($\phi_2$SiO)$_4$, (MeViSiO)$_4$, (Et$_2$SiO)$_3$, ($\phi_2$SiO)$_3$, (MeViSiO)$_3$, (Et$\phi$SiO)$_3$, Si0 $\phi_2$SiOM3$_2$SiO and $\phi_2$SiO$\phi_2$SiOMeViSiO; with an organosilylamine compound having the general formula,

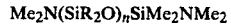

Me$_2$N(SiR$_2$O)$_n$SiMe$_2$NMe$_2$ wherein each R radical is independently selected from the group consisting of —Me, —Et, —Vi, —$\phi$, and mixtures thereof, and n is an integer from 2–12 inclusive. The interaction between the diorganosiloxane and the organosiliylamine takes place in the presence of a catalyst represented as

Me$_4$N$^+$ $^-$O(SiMe$_2$O)$_n$H where n is approximately 4 (N-catalyst). This reaction product is then interacted with a diol selected from the group consisting of Si$\phi_2$(OH)$_2$, O(Si$\phi_2$OH)$_2$ and HO(-SiMe$_2$O)$_n$H, wherein n is an integer from 15 to 20 inclusive, producing polydiorganosiloxane block copolymers.

In a further aspect of the present invention, in accordance with its objects and purposes, the block polydiorganosiloxane copolymers may be further reacted with a compound having the formula,

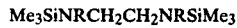

Me$_3$SiNRCH$_2$CH$_2$NRSiMe$_3$ wherein each R radical is independently selected from the group consisting of methyl and hydrogen, producing trimethylsilyl end-blocked polydiorganosiloxane copolymers.

The present invention provides a method for synthesizing polydiorganosiloxane block copolymers rapidly and efficiently. These polymers are produced without the need for the use of alkali metal silanolate complexes. Additionally, the synthesis provides for the addition of the catalyst in only one step, causing essentially all of the starting diorganocyclosiloxane materials to form polymer chains of appropriate molecular weight depending upno the amount of amine-terminated siloxane employed. The synthesis, as defined by the present invention, may be accomplished in a time period of approximately 8 hours. Unexpected superior results have been obtained over known synthesis methods by converting essentially all of the starting materials to polydiorganosiloxane block copolymers, compared to starting material waste of up to seventy percent with previously known methods.

DESCRIPTION OF THE PREFERRED EMBODIMENTS

In accordance with the present invention, diorganocyclosiloxanes are reacted with an amino-terminated siloxane oligomer in the presence of a catalyst. The catalyst serves to provide ring opening polymerization, creating a prepolymer. Addition of the silylamine oligomer causes the prepolymers formed to be amine-terminated. Subsequently, a slight excess of silanediol is added, resulting in condensation polymerization, with the amine-terminated prepolymer forming a silanol-terminated block copolymer. An end-blocking compound can then be reacted with the condensation polymerization product to produce trimethylsilyl-terminated polydiorganosiloxane block copolymers.

The diorganocyclosiloxanes which are used in the synthesis of this invention are selected from the group consisting of $(Me_2SiO)_4$, $(\phi_2SiO)_4$, $(MeViSiO)_4$, $(Et_2SiO)_3$, $(\phi_2SiO)_3$, $(MeViSiO)_3$, $(Et\phi SiO)_3$, $\phi_2SiO\phi_2SiOMe_2SiO$, and $\phi_2SiO\phi_2MeViSiO$.

Such diorganocyclosiloxanes, as well as methods for their preparation, are well known in the art. The more preferred compounds are $(Me_2SiO)_4$, $(\phi_2SiO)_4$, and $(MeViSiO)_4$.

Ring opening polmerization of the diorganosiloxane proceeds via catalyzation. The catalyst employed is $Me_4N^+{}^-O(SiMe_2O)_nH$ (N-catalyst), where n is approximately 4. N-catalyst is deactivated at elevated temperatures, thereby terminating ring opening polymerization. Catalysts of this nature are called "transient", and it is postulated that the method of the invention may be practiced with virtually any transient catalyst.

N-catalyst was prepared by introducing 74 g (1-gram mole) $(Me_2SiO)_4$; 100 g of benzene; and 44 g tetramethylammonium-hydroxide-pentahydrate into a reaction flask equipped with an agitator, a Dean-Stark trap with condenser, and fitted with means for providing a nitrogen or argon atmosphere. The benzene solution was refluxed under argon or nitrogen to remove water via the Dean-Stark trap, followed by heating the flask to approximately 81° C. Further heating resulted in the removal of benzene, yielding N-catalyst.

In the reaction mechanism of the ring opening polymerization, the catalyst acts upon the diorganocyclosiloxane, opening up the ring by breaking a Si—O bond. As rings are opened, diorganosiloxane units join to form chains. It is theorized that the first step in the catalyzed ring opening polymerization is the attack by a negatively charged oxygen atom in the catalyst on a silicon atom in the siloxane ring, simultaneously cleaving a Si—O bond in the cyclic oligomer, resulting in ring cleavage. As rings are opened, diorganosiloxane molecules join together to form a chain. This chain is a non-blocked prepolymer. A more complete description of the catalyzed ring openign mechanism is described in *J. Am. Chem. Soc.* 76, p. 249–51 (1954).

Consider, for example, the ring opening polymerization of $(Me_2SiO)_4$ using N-catalyst. The Si—O bonds of the ring are broken, resulting in the formation of linear chains made up of —SiMe$_2$O units. Additionally, ring opening polymerization may also be practiced with mixtures of diorganocyclo-siloxanes. If $(Me_2SiO)_4$ and $(\phi_2SiO)_4$ are the starting materials, linear chains randomly composed of —SiMe$_2$O and —Si$\phi_2$O units are formed. It is understood that the preceding examples are not intended to limit the scope of the invention, and all combinations of the diorganocyclosiloxanes previously mentioned may be employed.

If ring opening polymerization in the catalyzed Si—O bond breakage reaction is permitted to go unchecked, a substantial percentage of diorganocyclosiloxane starting material is present at equilibrium and does not react. Additionally, the non-amine-terminated prepolymer which is formed is much too long, and owing to relatively high viscosity, becomes difficult to work with. These problems are alleviated by the introduction of the organosilylamine in the reaction sequence. These compounds serve as end-blockers and insure that substantially all of the diorganocyclosiloxane rings open to form amine-terminated polymers which are of the average prescribed chain length. The organosilylamines which are used are selected from the group consisting of $Me_2N(SiMe_2O)_nSiMe_2NMe_2$, $Me_2N(Si\phi_2O)_nSi\phi_2NMe_2$, $Me_2N(SiMeViO)_nSiMeViNMe_2$, and $Me_2N(SiEt_2O)_nSiEt_2NMe_2$ wherein n is an integer from 2 to 12 inclusive. The preferred organosilylamine compound is $Me_2N(SiMe_2O)_3SiMe_2NMe_2$.

In one method for preparing organosilylamines, an organosiloxane halide is reacted with a dialkylamine in the presence of an alkaline earth metal. The solid metal halide byproduct reacts further with a nitrogen base compound to form a complex of metal halide and nitrogen base, e.g., $Me_2NMgCl$. The complex is liquified, and the organosilylamine is thereafter separated. A more detailed description of this method is found in U.S. Pat. No. 3,467,686.

To illustrate the ring opening polymerization, $(Me_2SiO)_4$ and $MeNMe_2SiO(SiMe_2O)_nSiMe_2NMe_2$ are reacted in the presence of N-catalyst as shown by the following equation:

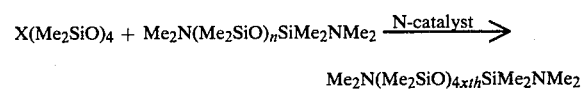

$$X(Me_2SiO)_4 + Me_2N(Me_2SiO)_nSiMe_2NMe_2 \xrightarrow{\text{N-catalyst}}$$

$$Me_2N(Me_2SiO)_{4xth}SiMe_2NMe_2$$

Si—O bonds of the ring are broken, resulting in the formation of linear chains made of dimethylsiloxane units. Additionally, ring opening polymerization may also be practiced with mixtures of diorganosiloxanes, as illustrated in the following equation:

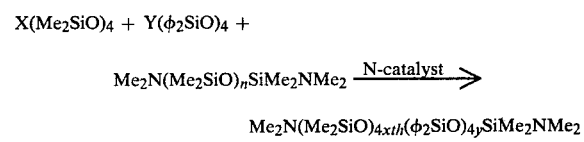

$$X(Me_2SiO)_4 + Y(\phi_2SiO)_4 +$$

$$Me_2N(Me_2SiO)_nSiMe_2NMe_2 \xrightarrow{\text{N-catalyst}}$$

$$Me_2N(Me_2SiO)_{4xth}(\phi_2SiO)_{4y}SiMe_2NMe_2$$

Four variables dominate ring opening polymerization: (1) time, (2) temperature; (3) amount of catalyst, and (4) amount of organosilylamine used as an end-blocking compound. A temperature range of from about 90° to 125° C. is suitable without destroying the catalyst, and a temperature of about 100° C. is preferred. The amount of catalyst must be sufficient to initiate the breakage of siloxane bonds and yet not be so great as to create exceptionally long chains with a large percentage of the diorganocyclosiloxane remaining unreacted. The amount of organosilylamine used determines the molecular weight of the product.

As practiced by the invention, diorganocyclosiloxanes and an organosilylamine are charged into a reaction vessel, stirred and heated to approximately 100° C. The catalyst is aded and the mixture is permitted to equilibrate, producing an amine-terminated prepolymer having a molecular weight dependent upon the amount of organosilylamine used.

This prepolymer is then interacted with a silanediol selected from the group consisting of $Si\phi_2(OH)_2$, $O(Si\phi_2OH)_2$ and $HO(SiMe_2O)_nH$, wherein n is an integer from 15 to 20 inclusive. The preferred silanediol is $HO(SiMe_2O)_{15}H$. Interaction of the silanediol with the blocked prepolymers results in condensation polymerization, with units of prepolymer blocks joining to form chains. Consider the reaction of a blocked prepolymer (amine-terminated) having the general formula,

$Me_2N(SiR_2O)_nNMe_2$ with $HO(SiMe_2O)_{15}H$. The reaction produces the following intermediate products:

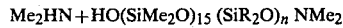

$Me_2HN + HO(SiMe_2O)_{15} (SiR_2O)_n NMe_2$

The intermediate siloxane has a reactive terminal silanol group which can react with another amine-terminated prepolymer and again increase the length of the polymer chain. Additionally, the other end of the intermediate product has a terminal amine group which can also be a source for polymer chain growth by reaction with silanol. The reaction product of the condensation polymerization is a diorganosiloxane polymer gum. Ideally, the concentrations of the blocked prepolymer and the silanediol should be about equal, to permit essentially complete polymerization of the blocked prepolymer. The result is a silanol-terminated diorganosiloxane copolymer.

The silanol-terminated copolymers may be reacted further with an end-blocking compound having the formula,

$Me_3SiNRCH_2CH_2NRSiMe_3$ wherein R may be either hydrogen or a methyl group. The end-blocking compound is preferably $Me_3SiNMeCH_2CH_2NMeSiMe_3$. Interaction with the end-blocking compound results in the formation of trimethylsilyl-terminated polydiorganosiloxane block copolymers. The chain length of the polymers increase until the end-blocking compound is added. The end-blocking compound and the hydroxy-terminated polymers are reacted. This results in condensation and formation of triorganosilyl end groups.

The instant invention provides a novel synthesis for the production of diorganosiloxane polymers which produces high yields of polymers in a greatly reduced period of time relative to known methods. The diorganosiloxane products have a wide range of utility. After suitable formulation and processing, the diorganosiloxanes can be incorporated in silicon rubbers or stress cushions. Silicon rubbers are suitable for use under extreme temperature and weather conditions, such as space travel applications, and as cable insulators and gaskets.

The following example is illustrative of a known synthesis method for the preparation of polydiorganosiloxane block copolymers performed for the inventors, and clearly demonstrates the extent of starting material waste.

Diorganosiloxanes were prepared with a known synthesis method. $(SiMe_2O)_4$ and $(Si\phi_2O)_4$, in a ratio by weight of 4 to 1, were mixed together in a reaction vessel under an argon atmosphere. The mixture was heated to 90° C., and small increments of approximately 50 ppm of N-catalyst were added to the reaction mixture at 30 to 60 minute intervals until the $(\phi_2SiO)_4$ reacted. The mixture was heated to 150° C. to decompose the catalyst, leaving a phenyl prepolymer which was a cloudy, slightly viscous liquid. Cloudiness of the liquid indicate the presence of unreacted $(Si\phi_2O)_4$. About 761.3 g of this material was mixed with 280.7 g of 1,7-N,N-bis(dimethylamino)octamethyltetrasiloxane and 8.3 g $(SiMeViO)_4$ and heated to 80° C. 0.004 g N-catalyst was added to the reaction vessel and the mixture was maintained at 90° C. for 4.5 hours and left at room temperture overnight. Subsequently, the mixture was heated to 80° C. and 0.2 g N-catalyst was added. The mixture was maintained at this temperature for 2.5 hours, and then heated to 150° C. to decompose the N-catalyst. The amount of unpolymerized starting material present in the product was determined by stripping the product under a vacuum of approximately 800 microns; 35.9 g of the colorless liquid distilled over from 51.3 g of product indicating unreacted starting materials of approximately 70 percent.

EXAMPLES

The following examples carried out for the inventors are illustrative of the present invention and are not to be regarded as limitative. It is to be understood that all parts, percentages and proportions referred to herein and in the appended claims are by weight unless otherwise indicated.

EXAMPLE 1

About 304 g $(SiMe_2O)_4$, 96 g $(Si\phi_2O)_4$, 3.2 g $(SiMeViO)_4$ and 147.5 g $Me_2N(SiMe_2O)_3 SiMe_2NMe_2$ were charged into a resin kettle equipped with a condenser and drying tube, gas inlet, thermometer and mechanical stirrer. The reaction kettle was maintained under an argon blanket and gradually heated to 100° C. Between 0.2 to 0.3 wt. % of the total weight of the siloxanes of $Me_4N^+ {}^-O(SiMe_2O)_nH$ (n-catalyst, where n is approximately 4), was added and stirred at 100° C. until the reaction slurry cleared. The material was allowed to equilibrate one additional hour. The temperature was then raised to 150° C. for 15 minutes to kill the remaining active catalyst. An amine-terminated prepolymer having an approximate molecular weight of 2,000 was produced. The prepolymer was then condensed with a stoichiometric amount of a silanol-terminated polydimethylsiloxane having an approximate molecular weight of 1600, represented as $HO(SiMe_2O)_{15}H$, at a temperature of 90° C. in a sigma blade mixer. The gum produced was then endcapped with $Me_3SNHCH_2CH_2NHSiMe_3$ in a relationship of 0.002 mole per Kg of gum, in the same sigma blade mixer. The final gum was then washed with distilled water and vacuum dried at 60° C.

About 18 g of the amine-terminated prepolymer synthesized above was stripped under a vacuum of approximately 300 microns. No distillate was obtained, indicating essentially complete reaction of the starting materials (nearly 100%) in contrast to the known synthesis method as shown in Example 1.

EXAMPLE 2

About 332 g (Siφ2O)4, 998 g (SiMe2O)4, 15 g (SiMeViO)4 and 491 g Me2N(SiMe2O)3 SiMe2NMe2 were mixed in a two-liter resin kettle and heated to 100° C. At this point 5.91 g N-catalyst was added and an additional 3.50 g N-catalyst was added an hour later. The reaction mixture was allowed to equilibrate for four hours, and then heated at 150° C. for 15 minutes to decompose any remaining N-catalyst, leaving a prepolymer product. About 5771 g of the prepolymer was then charged into a sigma blade mixer along with 450 g HO(SiMe2O)15H and 0.25 ml trifluoroacetic acid as an accelerator. One hour later, an additional 0.25 ml trifluoroacetic acid was added and allowed to react until a stiff gum was produced. Exactly one ml Me3SiNHCH2CH2NHSiMe3 was then added and the reaction mixture heated and stirred one hour. The reaction product was then washed with distilled water and vacuum dried.

EXAMPLE 3

About 480 g (Siφ2O)4, 1520 g (SiMe2O)4, 18 g (SiMeViO)4 and 737 g Me2N(SiMe2O)3 SiMe2NMe2 were charged into a three-liter reaction kettle and heated to 100° C. 8.98 g N-catalyst was added and 40 minutes later an additional 6.94 g N-catalyst was added. The reaction mixture was allowed to continue equilibrating at 100° C. for three hours. Any remaining N-catalyst was then decomposed by heating the reaction mixture to 150° C. for 15 minutes. The reaction mixture was then allowed to set at room temperature and filtered through a fritted glass funnel under argon, leaving a prepolymer product. About 2480 g of the prepolymer was then charged into a sigma blade mixer along with 1860 g HO(SiMe2O)15H and one ml trifluoroacetic acid accelerator and heated to 200° F. About 2.6 ml increments of Me2N(SiMe2O)3 SiMe2NMe2 were then added at half-hour intervals until a stiff gum was produced. About 26 ml Me3SiNHCH2CH2NHSiMe3 was then added to the stiff gum and the mixture maintained at 200° F. for one hour. The product was washed with distilled water and allowed to dry under vacuum.

As shown in the preceding examples, nearly 100% of the starting materials were converted to polydiorganosiloxane block copolymers, compared to only about 30% with a known synthesis method. Such an increase is an unexpected improvement in the art.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

We claim:

1. A method for synthesizing polysiloxane polymers comprising:
   (a) interacting the following to produce a first reaction product,
   (i) a diorganocyclosiloxane selected from the group consisting of (Me2SiO)4, (φ2SiO)4, (MeViSiO)4, (Et2SiO)3, (φ2SiO)3, (MeViSiO)3, (EtφSiO)3, SiOφ2SiOMe2SiO, and SiOφ2SiOMeViSiO,
   (ii) an organosilylamine having the general formula, Me2N(SiR2O)$_n$SiMe2NMe2 wherein each R radical is independently selected from the group consisting of —Me, —Et, —Vi, —φ, and mixtures thereof, and n is an integer from 2 to 12 inclusive, and
   (iii) a catalyst of the general formula Me4N+ −O(SiMe2O)$_n$H wherein n is approximately 4; and
   (b) reacting the reaction product of step (a) with a silanediol selected from the group consisting of Siφ2(OH)2, O(Siφ2OH)2 and HO(SiMe2O)$_n$H wherein n is a an integer from 15 to 20 inclusive to produce a second reaction product.

2. The method of claim 1, wherein the diorganocyclosiloxane of step (i) is selected from the group consisting of (Me2SiO)4, (φ2SiO)4 and (MeV1SIO)4.

3. The method as defined in claims 1 or 2, further comprising interacting the second reaction product of step (b) with a compound having the formula, Me3SiNRCH2CH2NRSiMe3 wherein each R radical is independently selected from the group consisting of methyl and hydrogen.

4. The method as defined in claims 1, 2 or 3, wherein the organosilylamine is,

Me2N(SiMe2O)3 SiMe2NMe2.

5. The method as defined in claims 1, 2 or 3, wherein the silanediol is HO(SiMe2O)$_n$H, wherein n is an integer from 15 to 20 inclusive.

6. The method as defined in claim 3, wherein the compound interacted with the second reaction product of step (b) is Me3SiNMeCH2CH2NMeSiMe3.

7. A method for synthesizing polysiloxane polymers comprising:
   (a) reacting the following compounds,
   (i) a diorganocyclosiloxane selected from the group consisting of (Me2SiO)4, (φ2SiO)4 and (MeViSiO)4, and
   (ii) an organosilylamine having the general formula, Me2N(SiR2O)$_n$SiMe2NMe2 wherein each R radical is independently selected from the group consisting of —Me, —Et, —Vi, —φ, and mixtures thereof, and n is an integer from 2 to 12 inclusive;
   (b) adding a catalyst of the general formula Me4N+ −O(SiMe2)$_n$H wherein n is approximately 4, to the reacted compounds of step (a) to form a first reaction product; and (c) interacting said first reaction product of step (b) with a diol selected from the group consisting of $Si\phi_2(OH)_2$, $O(Si\phi_2OH)_2$ and $HO(SiMe_2O)_nH$, wherein n is an integer from 15 to 20 inclusive, to form a second reaction product.

8. The method as defined in claim 7, further comprising interacting said second reaction product of step (c) with a compound of the formula, $Me_3SiNRCH_2CH_2NRSiMe_3$ wherein each R radical is independently selected from the group consisting of methyl and hydrogen.

9. The method as defined in claims 7 or 8, wherein the organosilylamine is:

$Me_2N(SiMe_2O)_3 SiMe_2NMe_2$.

10. The method as defined in claims 7 or 8, wherein the silanediol is $HO(SiMe_2O)_nH$ wherein n is an integer from 15 to 20 inclusive.

11. The method as defined in claims 7 or 8, wherein the reaction product of (b) is reacted with $Me_3SiNMeCH_2CH_2NMeSiMe_3$.

* * * * *

UNITED STATES PATENT OFFICE
CERTIFICATE OF CORRECTION

Patent No. 4,348,504                           Dated  September 7, 1982

Inventor(s) Nora Butler; Edward S. Jessop; John R. Kolb

It is certified that error appears in the above-identified patent and that said Letters Patent are hereby corrected as shown below:

On the information (front) page of the patent, the Attorney, Agent or Firm should be changed to -- Paul Davis; Roger S. Gaither; Richard G. Besha -- .

Signed and Sealed this

Twenty-fourth Day of May 1983

[SEAL]

Attest:

DONALD J. QUIGG

Attesting Officer        Acting Commissioner of Patents and Trademarks